UNITED STATES PATENT OFFICE.

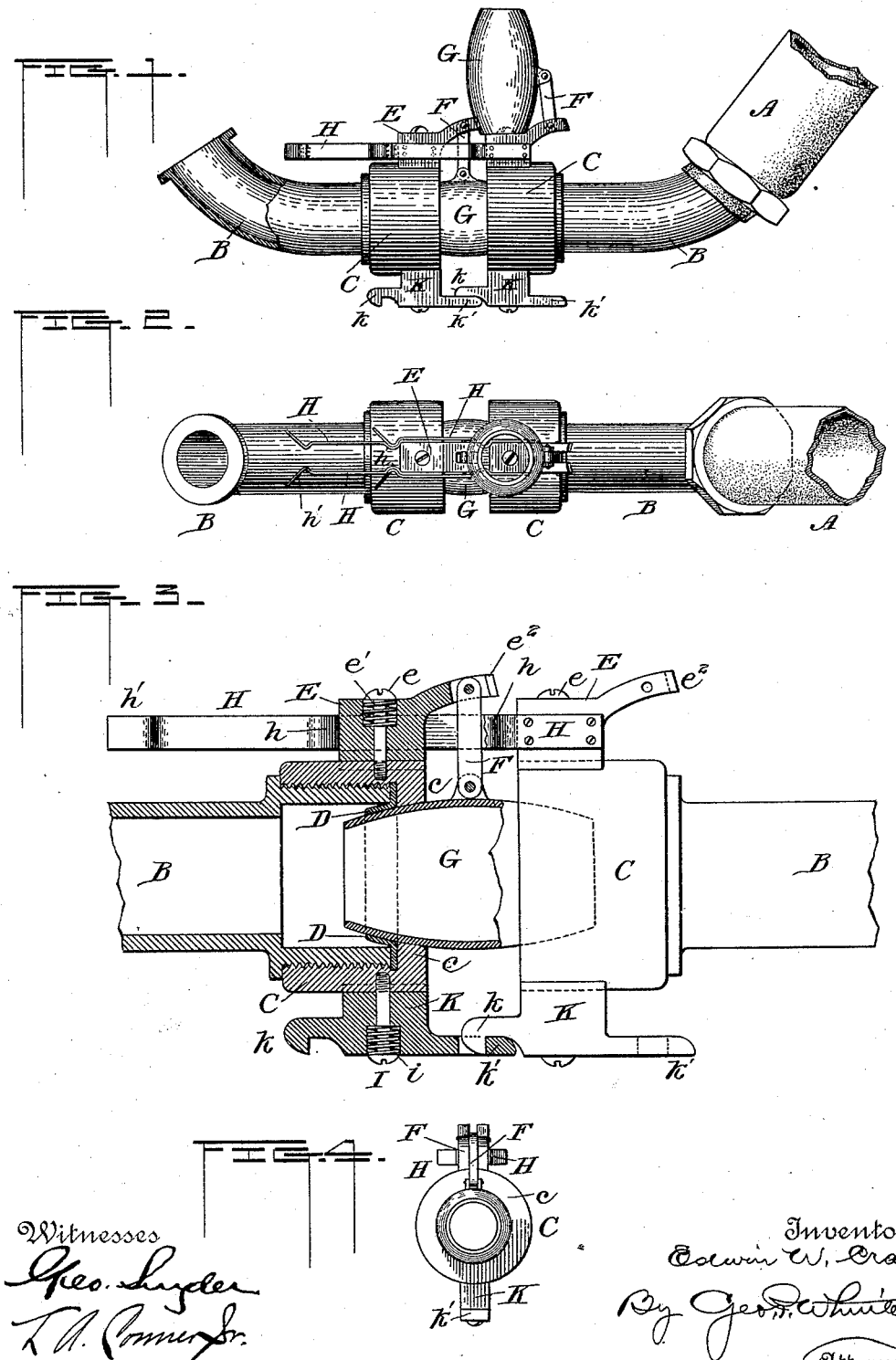

EDWIN W. CRAINE, OF MISSOURI VALLEY, IOWA.

PIPE-COUPLING.

SPECIFICATION forming part of Letters Patent No. 465,087, dated December 15, 1891.

Application filed July 22, 1891. Serial No. 400,333. (No model.)

*To all whom it may concern:*

Be it known that I, EDWIN W. CRAINE, a citizen of the United States, residing at Missouri Valley, in the county of Harrison and State of Iowa, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to detachable pipe-couplings for connecting the ends of flexible hose attached to the air, steam, gas, or water pipes on railway-trains.

It consists in certain novel features of construction, as hereinafter set forth, and particularly pointed out in the claims.

In the drawings, Figure 1 is a side elevation showing two pipes connected by my coupling. Fig. 2 is a top plan view. Fig. 3 is an elevation, partly in section, on an enlarged scale. Fig. 4 is an end view.

Each half of the coupling is a duplicate of the other. The flexible hose A is firmly attached to the flanged end of a straight or curved stem B, the other end of which is provided with a male screw-thread to engage with a female thread on a head C. The end of the head has an internal flange $c$, forming a shoulder between which and the end of the stem B is clamped the outer edge of a gasket or annular packing D, of rubber, leather or the like.

To the upper side of the head an arm E is attached by a screw $e$. The hole for the screw is counterbored to permit the arm to be slid upward on the screw. A helical spring $e'$ is placed under the screw-head and bearing upon the bottom of the counterbore, so that the arm is yieldingly held upon the head. The meeting surfaces of the head and arm are similarly curved or otherwise formed to prevent the parts from becoming displaced. The arm E extends beyond the head C, and its end is forked. In the fork is hinged one end of a link F, the other end of which is either jointed or rigidly attached to the middle of a double conoidal or barrel-shaped nipple G, the ends of which are adapted to enter the heads C and make a tight ground joint therewith which is doubly secure by reason of the gaskets D. Each head thus constitutes a socket to receive the nipple.

Fastened to the sides of each arm E are two flat springs H, each having an inward curve $h$ near the arm and a V-shaped bend $h'$ at the end. Attached by a screw I to the bottom of each head C is a block K, having a hook $k$ on one side and a stirrup $k'$ on the other. The block is counterbored around the screw, and a helical spring $i$ under the screw-head holds the block firmly against the head C. This mode of attaching the arms E and blocks K renders them reversible, the springs permitting them to be slightly lifted and turned and then dropped into place again. When an arm E is turned back, its nipple and link are inoperative, and may be rested on top of the arm, as shown in Figs. 1 and 2. The forked ends of the arm E may be curved at $e^2$, to afford a bearing-surface for the nipple to rest against.

In operation the nipple on one of the heads is arranged to enter both heads C, the springs H on the other head slipping past the arm E, and their V-shaped bends $h'$ engaging with the bends $h$ in the idle-springs. The blocks K are so arranged that the hook on one will enter the stirrup on the other. The parts are thus firmly locked together; but are capable of ready disengagement, either by hand or by the pulling apart of the train. Should one of the nipples or hooks become damaged the other is available for use.

Having thus described my invention, what I claim, and desire to secure by Letters Patent, is—

1. A detachable pipe-coupling consisting of two heads forming sockets, each head having an arm secured thereto, double-ended nipples each loosely connected with its respective arm, and interlocking fastenings attached to each head, substantially as described.

2. A detachable pipe-coupling consisting of two heads forming sockets, each head having an arm secured thereto, said arms having a link hinged to its end, double-ended nipples each jointed at its middle to its respective link, and fastening devices on each head adapted to engage with the other head, substantially as described.

3. The combination, with a socketed head, of a reversible arm attached thereto, a barrel-shaped nipple suspended from said arm, and fastening devices attached to said head, substantially as described.

4. The combination, with the head C, of the arm E, having a counterbored hole, a screw $e$, and spring $e'$, received in said hole, a link F, hinged to the end of the arm, and a barrel-shaped nipple G jointed to the link, substantially as described.

5. The combination, with the head C, of the reversible arm E, having fastened to it the flat springs H, provided with the bends $h\ h'$, and the reversible block K, having the hook $k$, and stirrup $k'$, substantially as described.

6. The combination, with the threaded stem B, of the head C screwed thereon, the gasket D, clamped between the stem and the head, the reversible arm E, attached to the head, and the nipple G, attached to the arm, substantially as described.

7. The combination, with the head C, of the arm E, and block K, each having a counterbored hole, the screws $e$ I, and springs $e'\ i$, located in said holes, the flat bent springs H, attached to the arm E, and the hook $k$, and stirrup $k'$, formed upon the block, substantially as described.

In testimony whereof I affix my signature in presence of two witnesses.

EDWIN W. CRAINE.

Witnesses:
WINDSOR J. LLOYD,
JNO. S. MCGAVREN.